Figure 1:
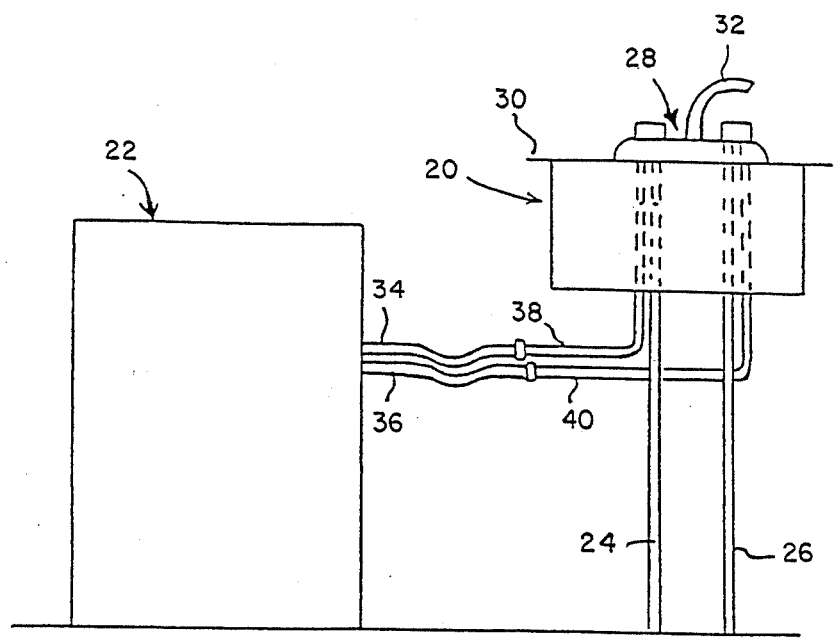

United States Patent [19]

Mazzei et al.

[11] Patent Number: 4,580,600

[45] Date of Patent: Apr. 8, 1986

[54] LAUNDRY FAUCET

[76] Inventors: Domonic Mazzei, P.O. Box 419, Beamsville, Ontario, L0R 1B0; Rene Pilon, 38 First Ave., La Salle, Quebec, H8P 2E5, both of Canada

[21] Appl. No.: 499,498

[22] Filed: May 31, 1983

[51] Int. Cl.[4] ............................................. F16K 19/00
[52] U.S. Cl. .................................. 137/597; 137/625.46
[58] Field of Search ................... 137/597, 563, 625.46

[56] References Cited

U.S. PATENT DOCUMENTS

| | | | |
|---|---|---|---|
| 796,249 | 8/1905 | Rohan | 137/597 X |
| 1,855,603 | 4/1932 | Lewis | 137/597 |
| 1,931,392 | 10/1933 | Otwell | 137/597 X |
| 2,120,807 | 6/1938 | Kundel | 137/597 X |
| 3,134,395 | 5/1964 | Glasgow | 137/597 X |
| 4,355,659 | 10/1982 | Kelchner | 137/597 X |

FOREIGN PATENT DOCUMENTS 476386 12/1952 Italy ..................................... 137/597

*Primary Examiner*—Robert G. Nilson
*Attorney, Agent, or Firm*—Fleit, Jacobson, Cohn & Price

[57] ABSTRACT

A faucet assembly for controlling supply of water to either a washing machine or a laundry tub comprise a pair of inlets each of which is selectively connectable to one of two outlets. A valve member is associated with each of said inlets, and is movable from a first position in which said respective inlet is connected to one of said outlets to a second position in which said inlet is connected to the other of said outlets. The valve member is moveable to a third position in which flow to both said outlets is prevented.

12 Claims, 10 Drawing Figures

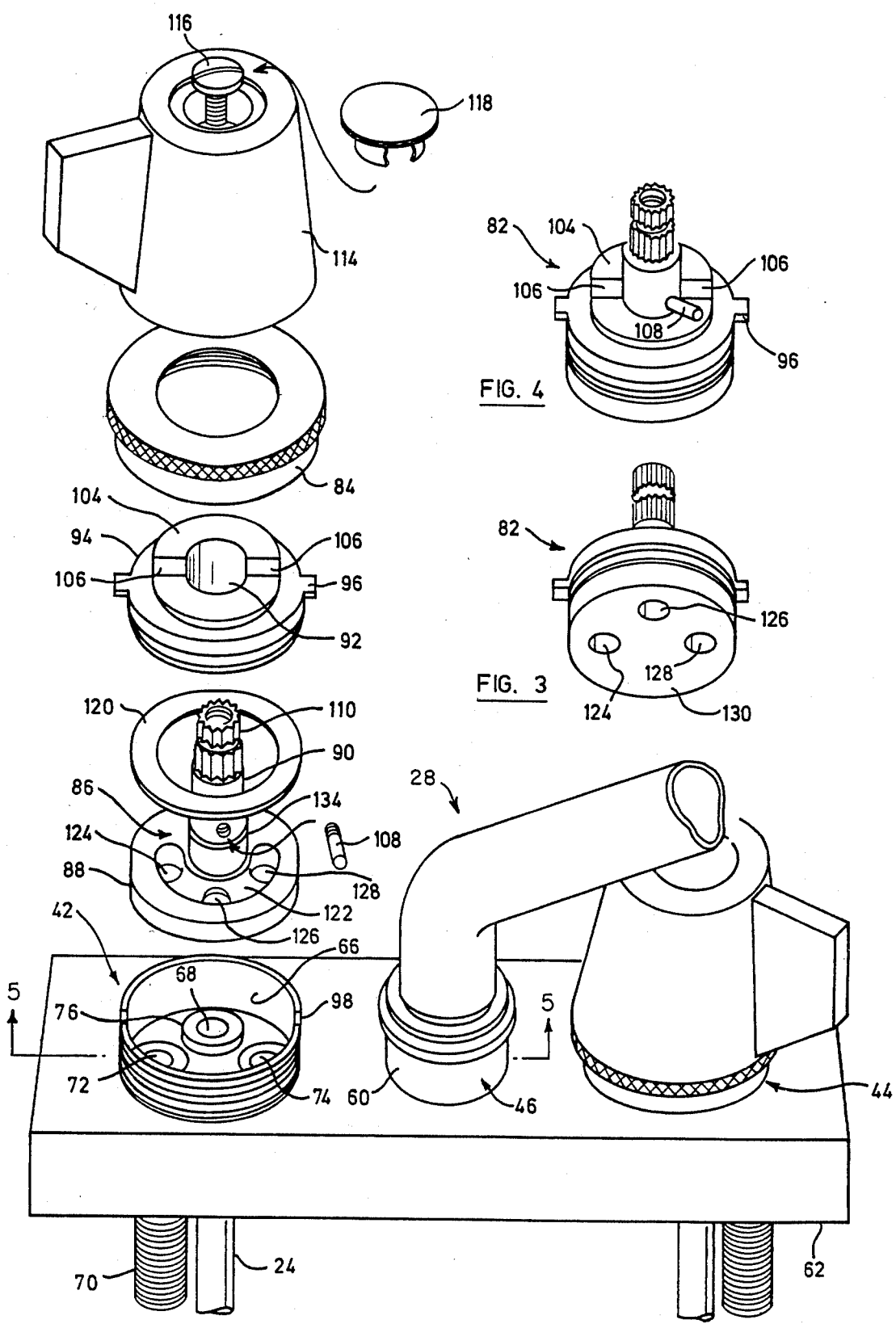

LAUNDRY FAUCET

The present invention relates to faucet assemblies and in particular to fauncet assemblies that may be used in conjunction with washing machines for controlling flow from a domestic supply to a washing machine.

It is common practice to install a washing machine adjacent a laundry tub. The washing machine and laundry tub are each supplied with hot and cold water and the supply of water to the laundry tub is controlled by a faucet mounted on the tub. The water supply for the washing machine faucet is taken from the tub supply conduit to the tub through a T piece and a separate faucet is mounted in each of the machines supply lines.

This arrangement whilst functioning satisfactorily in theory tends to be cumbersome and expensive in practice. The installation requires the use of Tee fittings in the main conduit and separate faucets to control supply to both the machine and to the tub. The faucets in the line to the machine are required to prevent flooding of the machine in the event that the check valves in the washing machine fail but are infrequently used due to their cumbersome operating mechanism and isolated location. Moreover the conventional installation is visuall unattractive because of the use of multiple components which need to be located in a position to which access may be gained. Whilst these disadvantages exist, the known arrangements, are nevertheless standard throughout the construction industry.

It is therefore an object of the present invention to provide a faucet assembly on which the above disadvantages are obviated or mitigated.

According therefore to the present invention there is provided a faucet assembly comprising a pair of inlets each of which is selectively connectable to one of two outlets and a valve member associated with each of said inlets, each of said valve members being movable from a first position in which flow of said respective inlet is connected to one of said outlets to a second position in which said inlet is connected to the other of said outlets.

By using the faucet assembly described above it is possible to have a single assembly mounted on the laundry tub in a conventional manner that may be used to direct water to either the machine or the tub. Preferably the movement from the two alternative positions is achieved by simple rotation of the valve member so that disconnection of the machine is convenient to achieve.

It is also preferred that a third position be provided for the valve member to prevent flow to both of the outlets so that both the tub and the machine can be disconnected at the same time.

Embodiments of the invention will now be described by way of example only with reference to the accompanying drawings in which, FIG. 1 is a schemmatic illustration of the installation of a machine and laundry tub.

Figure 5:
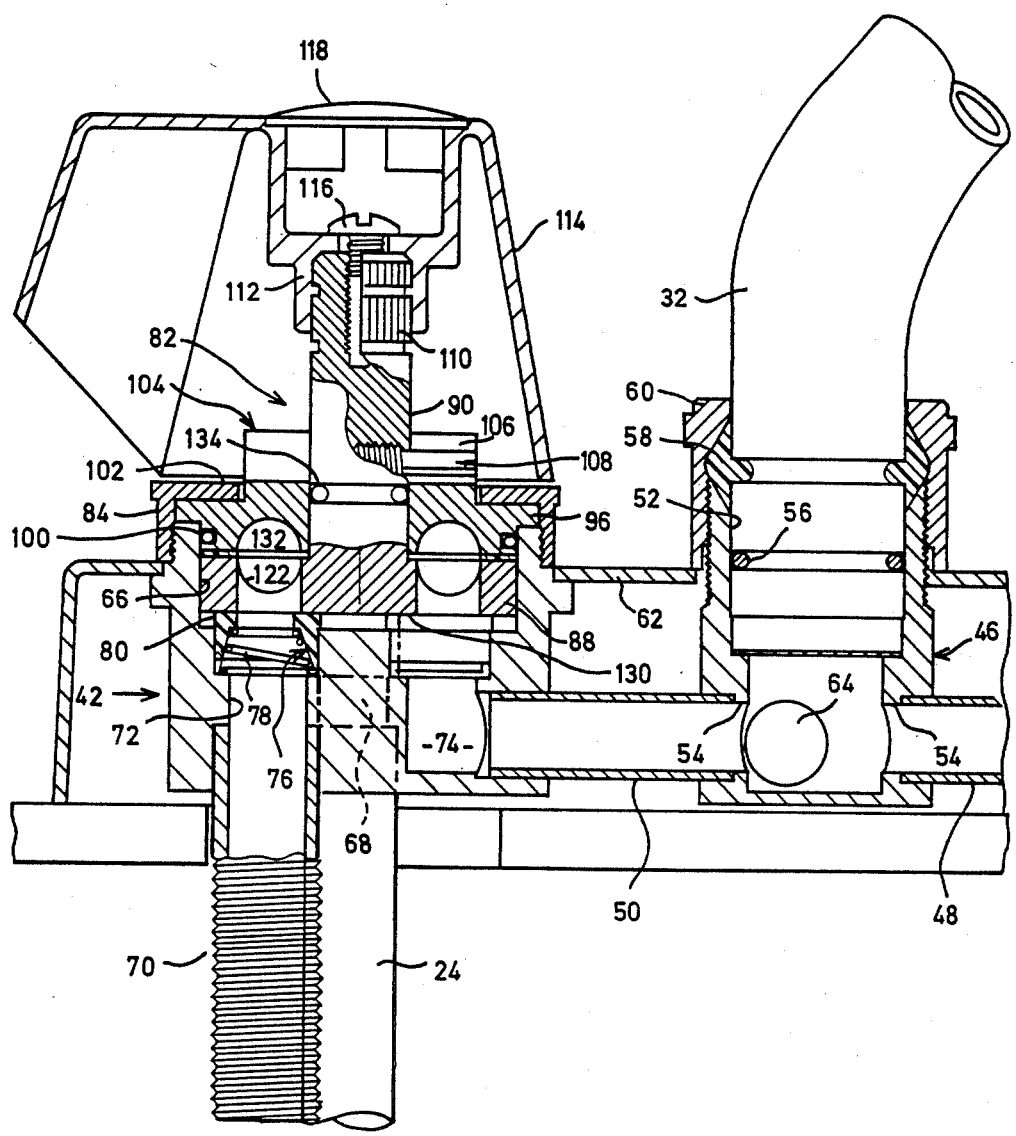
Figure 6A:
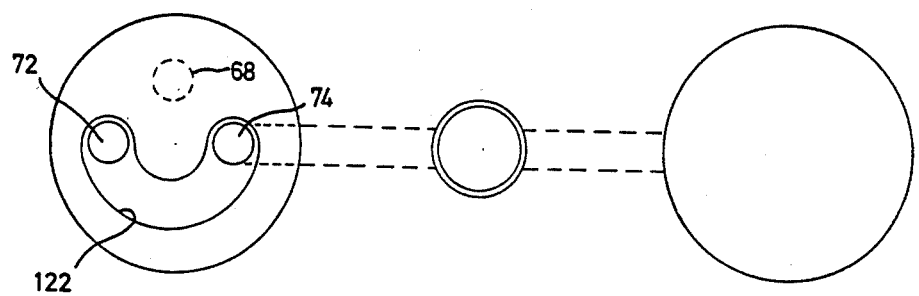
Figure 6B:
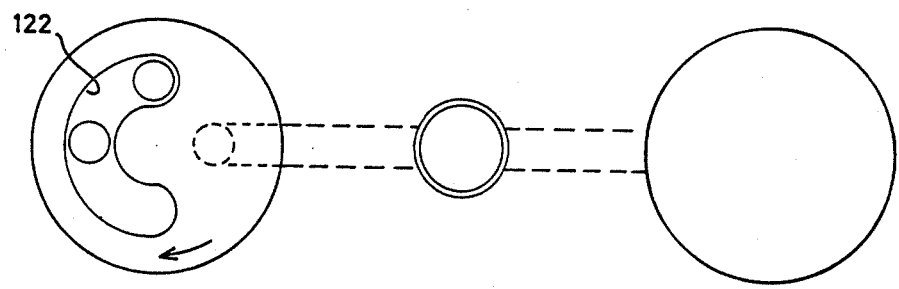
Figure 6C:
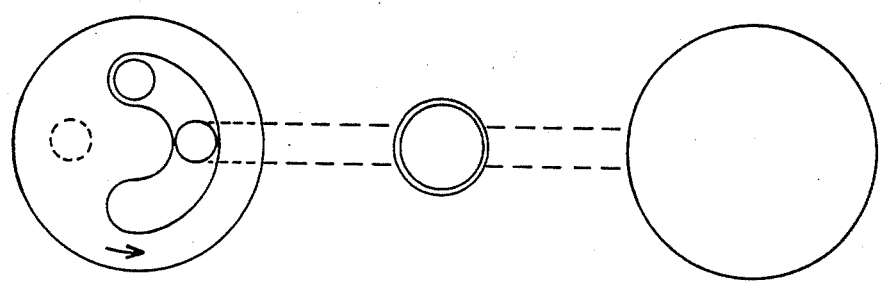
Figure 6D:
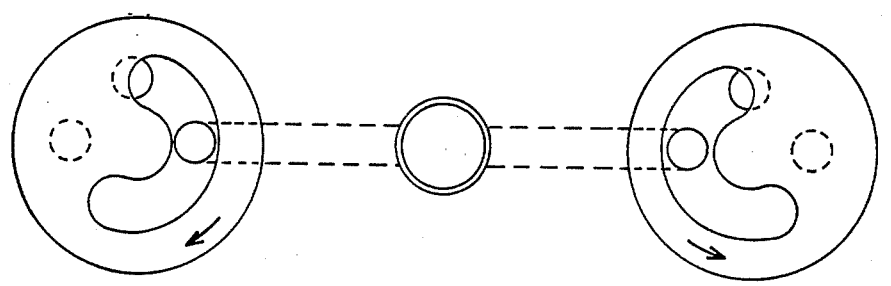
Figure 7:
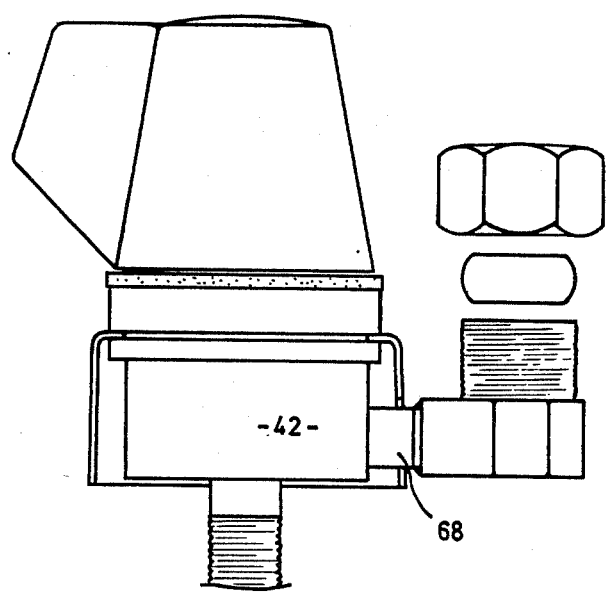

FIG. 2 is an exploded perspective view of a faucet assembly showing the various components used in that assembly, FIG. 3 is a perspective view showing the underside of the assembled valve member as used in the faucet of FIG. 2, FIG. 4 is a view similar to FIG. 3 showing the top perspective view of the assembled valve member, FIG. 5 is a sectional view of one half of the assembled faucet taken along the line 5—5 of FIG. 2, FIGS. 6A through 6D are diagrammatic representations of the alternative positions of the valve member in the faucet of FIG. 2 and, FIG. 7 is an end view of an alternative embodiment of the faucet of FIG. 2 showing an alternative type of connection.

Referring now to the drawings and in particular to FIG. 1 a domestic laundry installation includes a laundry tub 20 and a washing machine 22. Water is supplied to the laundry installation through hot and cold conduits 24-26 respectively located beneath the tub 20 and connected to a faucet assembly 28. The faucet assembly 28 is mounted on the rim 30 of the tub 20 in a conventional manner and supplies water to the tub 20 through a spout 32. The washing machine 22 has a pair of flexible inlet conduits 34-36 respectively that are connected by means of conduits 38-40 through the faucet assembly 28 to the hot and cold water pipes 24-26.

The details of the faucet assembly 28 may best be seen from FIGS. 2 through 5. The faucet assembly 28 comprises a pair of valve housings 42-44 located on opposite sides of a central chamber 46 and rigidly connected thereto by means of tubes 48-50. The chamber 46 has an internal cavity 52 communicating through lateral bores 54 with the interior of the tubes 48-50 and counterbored to receive the lower end of the spout 32.

A check valve 64 is also located within the chamber 46 to seal one of the tubes 48-50 in the event that water is supplied through only one of those tubes.

The spout 32 is sealed within the cavity 52 by means of an O ring 56 and retaining ring 58 and is retained in the chamber by means of a cap 60 that engages the retaining ring 58 and the threaded exterior of the chamber 56. The spout may therefore swing relative to the tub in the usual way. The cap 60 also serves to retain a skirt 62 that extends around the valve housings 42-44 and down to the rim 30 of the tub 20 to conceal the housings and chamber 46.

Each of the valve housings and the components associated therewith are identical and only one will therefore be discussed in detail. As may best be seen in FIG. 5, each valve housing 42-44 is counterbored to provide an internal cavity 66. The supply conduit 24 communicates with the cavity 66 through a bore 68. An outlet tube 70 is provided for connection to one of the conduits 38-40 and communicates with the cavity 66 through a bore 72. An internal passageway 74 is provided to connect the interior of the tube 50 to the cavity 66. A resilient seal member 76 comprising a spring 78 and a neoprene seal 80 is located in each of the bores 68-70 and passageway 74 within the cavity 66.

A valve assembly generally designated 82 is located within the cavity 66 and retained by means of a threaded cap 84. The valve assembly 82 includes a valve member 86 having a valve plate 88 and an upstanding stem 90. The stem 90 is rotatably received within a bore 92 extending through a valve body 94 that is provided with a pair of lateral tangs 96. An O-ring 134 seals between the stem 90 and bore 92 and the tangs 96 are received in corresponding recesses 98 in the valve housing 42 to prevent rotation of the body 94 relative to the housing 42. An O ring 100 seals between the valve body 94 and the wall of the cavity 66 and a radially extending lip 102 of the cap 84 retains the valve body in the housing 42. A semi-circular formation 104 having a pair of vertical abutment surfaces 106 is formed on the upper surface of the valve body 94 around the bore 92 to co-operate with a pin 108 received in the stem 90 and limit rotation of the stem relative to the valve body.

The upper end of stem 90 is splined as shown at 110 to receive an internally splined boss 112 formed on the interior of a handle 114. The handle 114 is secured to the stem 90 by a screw 116 that is concealed by a cover plate 118.

The undersurface of the valve body 94 and upper surface of the valve plate 88 lie adjacent one another and are separated by means of an annular friction reducing ring 120. A semi-circular recess 122 is provided in the upper surface of the plate 88 and has three ports 124, 126 and 128 respectively spaced apart along the length of the recess. Each of the ports 124, 126 and 128 extends through the plate 88 to its undersurface 130. The undersurface 130 is planar and rests in sealing relationship with each of the seal members 76. The undersurface of the valve body 94 is formed with an annular recess 132 overlying the semi-circular recess 122 to enlarge the passageway provided by the recess 122 between the ports 124, 126, 128.

The valve member 86 may be moved relative to the valve body to one of three positions as shown in FIG. 6. In the first of these positions as shown in FIG. 6A the valve member is positioned so that the sealing surface 130 of the valve plate 88 overlies the bore 68 with pin 90 located intermediate the abutment surfaces 106 so that the valve member may be rotated in either direction. In this position the semi-circular recess 122 extends between the bore 72 and the passageway 74. But because the bore 68 is sealed by the surface 130 water is not able to flow from the inlet 34 to either of the outlet tubes 70 or the internal passageway 74. Thus both the tub and the machine 20-22 are effectively isolated.

Upon rotation of the valve member clockwise as viewed from above the valve plate and valve body are moved into the relationship shown in FIG. 6B. In this position, the port 124 is in register with the bore 68 and the port 126 is in register with the bore 72. Fluid is thus able to flow from the inlet 34 to the outlet tube 70 and into the washing machine 22. The sealing surface 130 overlaps the internal passageway 74 to prevent water flowing to the tub.

Upon rotation of the valve member anticlockwise the plate is brought into the position of FIG. 6C. In this position, the bore 68 is in register with the port 128 and the internal passageway 74 is in register with the port 126. The bore 72 is sealed by the sealing face 130 so that water flows from the inlet 34 through the passageway 74 and tube 50 to the spout 32. Thus water may be supplied to the tub 20. The flow of water to either of the outlets may be metered by varying the register between the port 124-128 and the bore 68 in the manner shown in FIG. 6D. It will also be appreciated, as illustrated in FIG. 6D that each of the valve assemblies is independently moveable to provide any combination of water supply to the machine or tub.

It will be observed that the bores 68-72 and internal passage 74 are offset from the axis of rotation of the valve member 86 to permit the inlet 34 and the outlet tube 70 to be accommodated within a standard opening and in the rim of a laundry tub. It will also be observed that by virtue of the arrangement of the valve member it is not necessary to provide separate components to control the flow to the machine or to provide T members in the supply line.

An alternative arrangement of connection is shown in FIG. 7 to permit supply of water from above the tub as is common in basement installations. In this arrangement, the bore 68 is arranged to pass through the peripheral wall of the housing 42 so that an elbow may be connected at the rear of the housing to allow connection to a vertical pipe.

Whilst the invention has been described with reference to a washing machine application it will be appreciated that it may be used in other applications where service is required to one of two outlets. For example, the unit could be used in a bathroom to control flow to either a tub or a shower nozzle and in this situation may be either wall or deck mounted. The ability of the valve to regulate flow from each inlet is of course beneficial in obtaining the desired temperature of water.

The valve assembly may also be used where a single inlet supplies a pair of outlets. For example the valve could be used to control flow to a water operated garbage disposal unit and to a sink in a kitchen without the need for more than one faucet. Clearly this is particularly advantageous as the controls for the disposal unit are conveniently at hand.

The embodiments of the invention in which an exclusive property or privilege is claimed are defined as follows:

1. A faucet assembly comprising a pair of valve housings, each having an inlet for connection to respective fluid supplies, and a pair of outlets, one outlet of each valve housing being connected to a common discharge duct to provide a mixture of the fluid supplies therethrough and the other outlet of each valve housing being connected to respective discreet outlet conduits; and a pair of valve assemblies located in respective housings and each valve assembly each having a valve member which is independently moveable between a first position in which said inlet is connected to said one outlet, a second position in which said inlet is connected to said other outlet and a third position in which flow from said inlet to either of said outlets is prevented.

2. A faucet assembly according to claim 1 wherein each of said valve members moves through said third position in moving from said first to said second position.

3. A faucet assembly according to claim 2 wherein each of said valve members is rotatable about an axis to move from said first to said second position.

4. A faucet assembly according to claim 3 wherein said inlets and said outlets are spaced from said axis of rotation.

5. A faucet assembly according to claim 4 wherein each of said valve members includes a valve plate rotatable about an axis of rotation and having a sealing face in sealing engagement with said inlet and said outlets, said plate having a passageway therein to permit communication between said inlet and a selected one of said outlets.

6. A faucet assembly according to claim 5 wherein said valve plate includes a pair of openings extending through said plate from said sealing face to its opposite face and a conduit in said opposite face extending between said ports.

7. A faucet assembly as claimed in claim 5 wherein on each valve housing said inlet and said other outlet are parallel to and spaced from said axis of rotation of said valve plate.

8. A faucet assembly as claimed in claim 1 wherein a check valve is located at the connection between both of said one outlet ports and said discharge duct to seal one of said one outlet ports in the event that fluid is supplied to said discharge duct from only one of said valve members.

9. A faucet assembly as claimed in claim 1 wherein each of said valve assemblies comprises a body, and a valve plate rotatable relative to said body about an axis, said inlet and two outlets being formed in said valve housing to one side of said valve plate and displaced from said axis, said valve plate having a surface in sealing engagement with said inlet and said outlets with apertures through said plate corresponding to each of said inlet and outlets, passage means on the opposite side of said valve plate to said surface and extending between said apertures, said apertures being moveable into register with selected ones of said inlets and outlets by rotation of said valve plate relative to said body to permit flow from said inlet through said passage means to a selected one of said outlets.

10. A faucet assembly as claimed in claim 9 wherein said inlet and said outlets are located equidistant from said axis of rotation.

11. A faucet assembly as claimed in claim 9 wherein said inlet is located intermediate said outlets.

12. A faucet installation to be mounted on a laundry tub for controlling the flow of hot and cold water to either a laundry tub or to a washing machine comprising;
 a faucet assembly having a discharge spout to supply a mixture of hot and cold water to the tub;
 two outlet pipes connected between the faucet and the washing machine to carry hot and cold water respectively to the washing machine;
 and two inlet pipes which supply hot and cold water respectively to the faucet assembly, said faucet assembly including two valve housings, each having an inlet connected to a respective one of said inlet pipes and a pair of outlets, one of which is connected to a common discharge duct which leads to said spout and the other of which is connected to a respective one of said outlet pipes; and a pair of valve assemblies located in respective housings and each valve assembly having a valve member which is independently moveable between a position in which the flow from the inlet to either of the outlets is prevented and a position in which the inlet pipe is connected to a selected one of said outlets.

* * * * *